United States Patent
Bulygin et al.

(10) Patent No.: US 11,797,684 B2
(45) Date of Patent: Oct. 24, 2023

(54) METHODS AND SYSTEMS FOR HARDWARE AND FIRMWARE SECURITY MONITORING

(71) Applicant: ECLYPSIUM, INC., Beaverton, OR (US)

(72) Inventors: Yuriy Bulygin, Beaverton, OR (US); Oleksandr Bazhaniuk, Sunnyvale, CA (US)

(73) Assignee: Eclypsium, Inc., Beaverton, OR (US)

( * ) Notice: Subject to any disclaimer, the term of this patent is extended or adjusted under 35 U.S.C. 154(b) by 300 days.

(21) Appl. No.: 16/542,907

(22) Filed: Aug. 16, 2019

(65) Prior Publication Data

US 2020/0074086 A1 Mar. 5, 2020

Related U.S. Application Data

(60) Provisional application No. 62/723,867, filed on Aug. 28, 2018.

(51) Int. Cl.
*G06F 21/57* (2013.01)
*G06F 21/54* (2013.01)
*G06F 8/65* (2018.01)
*G06F 21/55* (2013.01)

(52) U.S. Cl.
CPC .............. *G06F 21/577* (2013.01); *G06F 8/65* (2013.01); *G06F 21/54* (2013.01); *G06F 21/554* (2013.01); *G06F 21/572* (2013.01)

(58) Field of Classification Search
CPC ............................... G06F 21/50; G06F 21/577
See application file for complete search history.

(56) References Cited

U.S. PATENT DOCUMENTS

| | | | |
|---|---|---|---|
| 6,957,348 B1 | 10/2005 | Flowers et al. | |
| 7,020,697 B1 | 3/2006 | Goodman et al. | |
| 7,032,114 B1* | 4/2006 | Moran | G06F 21/554 |
| | | | 713/176 |
| 7,809,366 B2 | 10/2010 | Rao et al. | |
| 8,166,544 B2 | 4/2012 | Memon et al. | |
| 8,302,191 B1* | 10/2012 | Conrad | H04L 63/145 |
| | | | 726/23 |
| 8,370,942 B1* | 2/2013 | Peterson | G06F 21/577 |
| | | | 726/24 |

(Continued)

FOREIGN PATENT DOCUMENTS

| | | | | |
|---|---|---|---|---|
| GB | 2418503 A | * | 3/2006 | ............. G06F 21/56 |
| WO | 2016132315 A1 | | 8/2016 | |

OTHER PUBLICATIONS

Unknown author, "Heuristic analysis", publisher: Wikipedia, 2 pages, page last edited on Mar. 27, 2021. (Year: 2021).*

(Continued)

*Primary Examiner* — Ponnoreay Pich
(74) *Attorney, Agent, or Firm* — McCoy Russell LLP

(57) ABSTRACT

Systems and methods are provided herein for monitoring and identifying potential security vulnerabilities in hardware and/or firmware of host devices. In an example, a client system includes a data interface, a processor, and a storage device storing instructions executable by the processor to collect firmware and/or hardware information relating to the client system and transmit, via the data interface, data associated with the firmware and/or hardware information to a remote device.

18 Claims, 4 Drawing Sheets

(56) References Cited

U.S. PATENT DOCUMENTS

| | | | |
|---|---|---|---|
| 8,793,796 | B2 | 7/2014 | Panasyuk |
| 8,869,282 | B1* | 10/2014 | Lazarowitz ............ G06F 21/562 |
| | | | 726/24 |
| 9,817,975 | B2 | 11/2017 | Liu et al. |
| 11,023,586 | B2* | 6/2021 | Bhatia ................... G06F 21/577 |
| 2006/0280150 | A1* | 12/2006 | Jha ........................... H04W 8/22 |
| | | | 370/338 |
| 2007/0277241 | A1* | 11/2007 | Repasi ..................... G06F 21/57 |
| | | | 726/24 |
| 2008/0077973 | A1 | 3/2008 | Zimmer et al. |
| 2008/0189789 | A1 | 8/2008 | Lamontagne |
| 2009/0132839 | A1 | 5/2009 | Rothman et al. |
| 2012/0073482 | A1 | 3/2012 | Meeker et al. |
| 2012/0255010 | A1 | 10/2012 | Sallam |
| 2012/0330801 | A1* | 12/2012 | McDougal .............. G06F 21/56 |
| | | | 705/34 |
| 2013/0104236 | A1 | 4/2013 | Ray et al. |
| 2013/0347131 | A1 | 12/2013 | Mooring et al. |
| 2014/0101426 | A1 | 4/2014 | Senthurpandi |
| 2014/0181972 | A1 | 6/2014 | Karta et al. |
| 2014/0189778 | A1* | 7/2014 | Li ............................ H04L 63/20 |
| | | | 726/1 |
| 2014/0373161 | A1* | 12/2014 | Hudson ............... H04L 63/1433 |
| | | | 726/25 |
| 2016/0088019 | A1* | 3/2016 | Li ......................... H04L 63/145 |
| | | | 726/1 |
| 2016/0098561 | A1* | 4/2016 | Keller ................... G06F 21/566 |
| | | | 726/24 |
| 2017/0048269 | A1* | 2/2017 | York ..................... G06F 21/577 |
| 2017/0286086 | A1* | 10/2017 | Narasimhan ........ G06F 11/1469 |
| 2017/0286681 | A1 | 10/2017 | Vajravel |
| 2017/0316204 | A1 | 11/2017 | Thakur et al. |
| 2018/0004505 | A1* | 1/2018 | Annapureddy ......... H04L 67/34 |
| 2018/0060589 | A1* | 3/2018 | Polak ..................... H04L 63/123 |
| 2018/0150293 | A1* | 5/2018 | Nachimuthu ....... G06F 12/0284 |
| 2020/0074086 | A1* | 3/2020 | Bulygin .................. G06F 21/54 |
| 2020/0202008 | A1* | 6/2020 | Pfleger de Aguiar ..................... |
| | | | G06F 11/3041 |
| 2020/0364340 | A1* | 11/2020 | Khoruzhenko ....... G06F 21/577 |
| 2020/0387611 | A1* | 12/2020 | Yao ....................... G06F 21/572 |

OTHER PUBLICATIONS

"The Enterprise Hardware Attack Surface and How To Defend It," Eclypsium Website, Available Online at https://eclypsium.com/wp-content/uploads/2019/03/Eclypsium-White-Paper-03_13_19.pdf, Oct. 14, 2018, 8 pages.

* cited by examiner

METHODS AND SYSTEMS FOR HARDWARE AND FIRMWARE SECURITY MONITORING

CROSS REFERENCE TO RELATED APPLICATIONS

The present application claims priority to U.S. Provisional Application No. 62/723,867 entitled "METHODS AND SYSTEMS FOR HARDWARE AND FIRMWARE SECURITY MONITORING", and filed on Aug. 28, 2018. The entire contents of the above-identified application are hereby incorporated by reference for all purposes.

FIELD

The disclosure relates to monitoring and identifying potential security vulnerabilities in hardware and/or firmware of host devices.

BACKGROUND

Security mitigation for computing devices has largely focused on software (e.g., the operating system and higher levels), while ignoring firmware and hardware levels of the devices. Vulnerabilities in hardware and firmware (e.g., physical layers) of devices are often overlooked, in part due to prior difficulties in accessing these layers. However, the ability to analyze physical layers of devices has become less arduous, and attackers have been the first to take advantage of the associated area of vulnerability. The large number of hardware and firmware manufacturers and distributors in every computing device creates additional difficulty for a company to monitor for attacks at the hardware/firmware level.

SUMMARY

In one embodiment, a client system includes a data interface, a processor, and a storage device storing instructions executable by the processor to collect firmware and/or hardware information relating to the client system and transmit, via the data interface, data associated with the firmware and/or hardware information to a remote device.

In this way, the client system (also referred to herein as a host device) may collect firmware and/or hardware information that may be used by the remote device to detect security threats. Thus, this disclosure provides a two-pronged system which includes a local agent on a monitored host (e.g., monitored hardware element of a host device) and a centralized server for analysis and reporting. A web-based interface may also be employed to enable interaction with the system and to allow users to take action to mitigate any detected threats.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
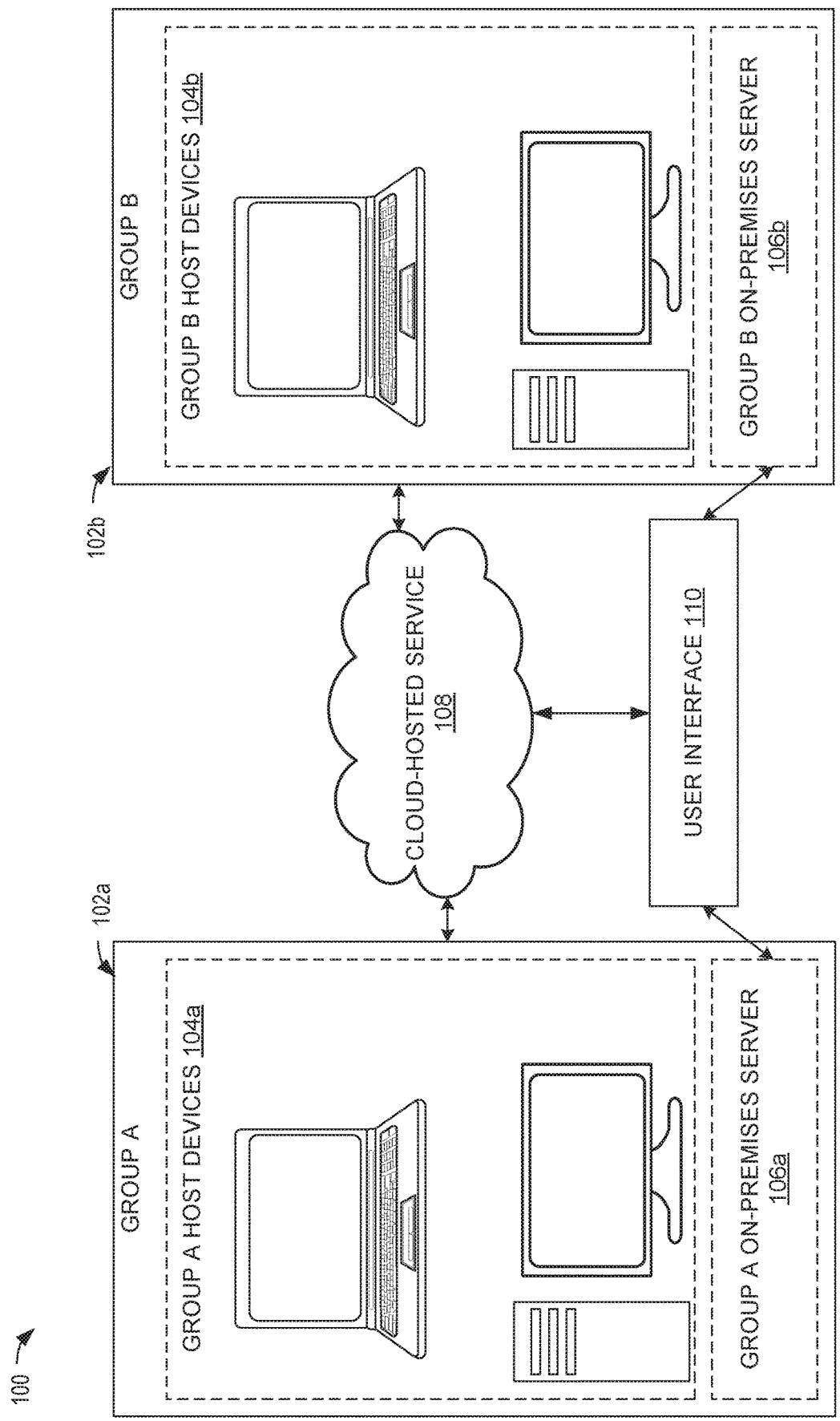
FIG. 1 shows an example security monitoring system in accordance with one or more embodiments of the present disclosure.

Computing devices operate according to a hierarchy of layers. For example, internal logic on components such as a motherboard, internal devices, and processors support operation of an operating system, which in turn supports applications, virtual hosts, and other services of the device. However, approaches to secure computing devices typically focus on upper levels of operation, such as the operating system and other software elements, with hardware layers being largely ignored. Hardware layers of devices are typically more difficult to analyze than higher layers of devices (e.g., operating systems and other software elements). For example, each device may include proprietary code that has vulnerabilities (e.g., opportunities for malicious tampering), yet the code may also be difficult to audit (e.g., to identify the vulnerabilities) and patch (e.g., to remove the vulnerabilities). Hardware issues may be widespread, as the security concerns discussed above apply to motherboards, hard drives, network or WIFI cards, graphics cards, system-on-chip, and other components that have internal controllers and firmware that drive behavior of the components. Compromising any of these devices provides access to sensitive information on an associated system.

Servers may also be affected, as baseboard management controllers (BMCs) and an Intelligent Platform Management Interface (IPMI) may be used to deliver dedicated management to servers using hardware and interfaces that are independent of the host operating system. The above interfaces are configured to ensure that servers are remotely manageable even when the host operating system is not running. However, by controlling this management infrastructure via hardware and/or firmware implants, the virtual environment of the system and/or the operating system of the system may be modified regardless of any security protocols associated with the software of the system. Intel Management Engine (ME) and Active Management Technology (AMT) may provide similar functionality to the BMCs and IPMI in a personal computer environment. Firmware of network routers and firewalls may also have backdoor access, thereby compromising security products configured to defend other computing components. Even peripheral devices, such as Universal Serial Bus (USB) devices, may include an internal controller that can be compromised and used to subvert the operating system of a device to which the peripheral device is connected.

The combination of the above devices create a complex ecosystem even when considering only a single host device (e.g., a single personal computer, laptop, etc.). Controlling security at the hardware level for an organization (e.g., a company) as a whole, which may include a combination of corporate laptops, networking gear, white-box servers supporting virtual environments, and numerous other devices, and tracking vulnerability in hardware components provides still further challenges. Reacting to vulnerabilities is also difficult at an organizational level, as performing organization-wide operations such as reinstalling operating systems on the computing devices of the organization will not address security flaws in the hardware level of the devices due to the control that the hardware/firmware of the devices has over the functioning of the devices.

The disclosure provides a new layer of security that is configured to protect computing systems at the hardware and firmware level. The disclosed mechanisms allow organizations to find vulnerabilities in devices, detect known implants active in the devices or tampering with the firmware of the devices, and actively isolate any affected devices.

The disclosed mechanisms may include performing a risk analysis of all monitored host devices in a targeted system, including performing an analysis of firmware versions, hardware components and configurations, known vulnerabilities in hardware and firmware of the host devices, and hardware protections supported by the targeted system. The disclosed mechanisms may also include providing a centralized management of system firmware updates and other firmware components. Through the above monitoring and analysis, the mechanisms may detect implants in system firmware, hardware components (e.g., motherboards, network interface cards, baseboard management controllers, graphics cards, hard disk drive and solid state drive storage devices, etc.), as well as operating system boot level implants. The disclosed mechanisms may also include performing runtime behavior monitoring, including analyzing the behavior of the host devices, firmware, and operating systems to identify signs of compromise and/or stealthy implant behavior. Upon discovery of any affected systems (e.g., devices that have signs of compromise or stealthy implant behavior), the disclosure provides hardware-based mechanisms for reliably isolating the affected systems. The hardware-based mechanisms that may be used to isolate affected systems include hardware shutdown, not through the operating system but independently over a hardware interface, and disabling the network interface through hardware interfaces.

The disclosed mechanism may utilize two components—a local agent on a monitored host device, and a centralized server for analysis and reporting. An example system 100 in which the disclosed hardware-level security monitoring mechanism may be deployed is shown in FIG. 1. The security monitoring mechanism may be deployed for use by multiple organizations 102a and 102b, as represented by Group A and Group B. Each organization may include one or more host devices 104a and 104b (respectively), such as laptops, desktop computers, and/or other computing devices. As will be described in more detail below with respect to FIG. 2, a local agent may be installed on each of the host devices in each group in order to collect information from the respective host devices. A software application and kernel driver which is part of the local agent may be used to extract device configuration and integrity data from hardware and software interfaces of the host device.

One group or each group may optionally include an on-premises server (e.g., a server local to each group), such as group A on-premises server 106a and group B on-premises server 106b. Additionally or alternatively, one group or each group may be coupled to a cloud-hosted service 108. Either the respective on-premises server 106a or 106b or the cloud-hosted service 108 may serve as a centralized server (e.g., within a private or public cloud network) for analyzing information collected from the local agent of each associated host device and reporting potential security risks based on the analysis of the information from the local agents. The centralized server may provide an analytics service that analyzes the configuration of each associated host device and identifies the presence of known and unknown hardware implants.

The system may further include a user interface 110, which may be a web-based user interface accessible via any network-connected computing device. The user interface 110 may allow administrators of the system 100 and/or of a respective organization 102a/102b to investigate potential security risks and take remediation action to reduce, remove, or isolate the security risks. The user interface may provide visibility into all host devices in a security environment (e.g., all host devices of a given group/organization and/or all host devices of a system), a dedicated view of risk to the organization as a whole, and an overall management of the monitoring of hardware/firmware security.

Figure 2:
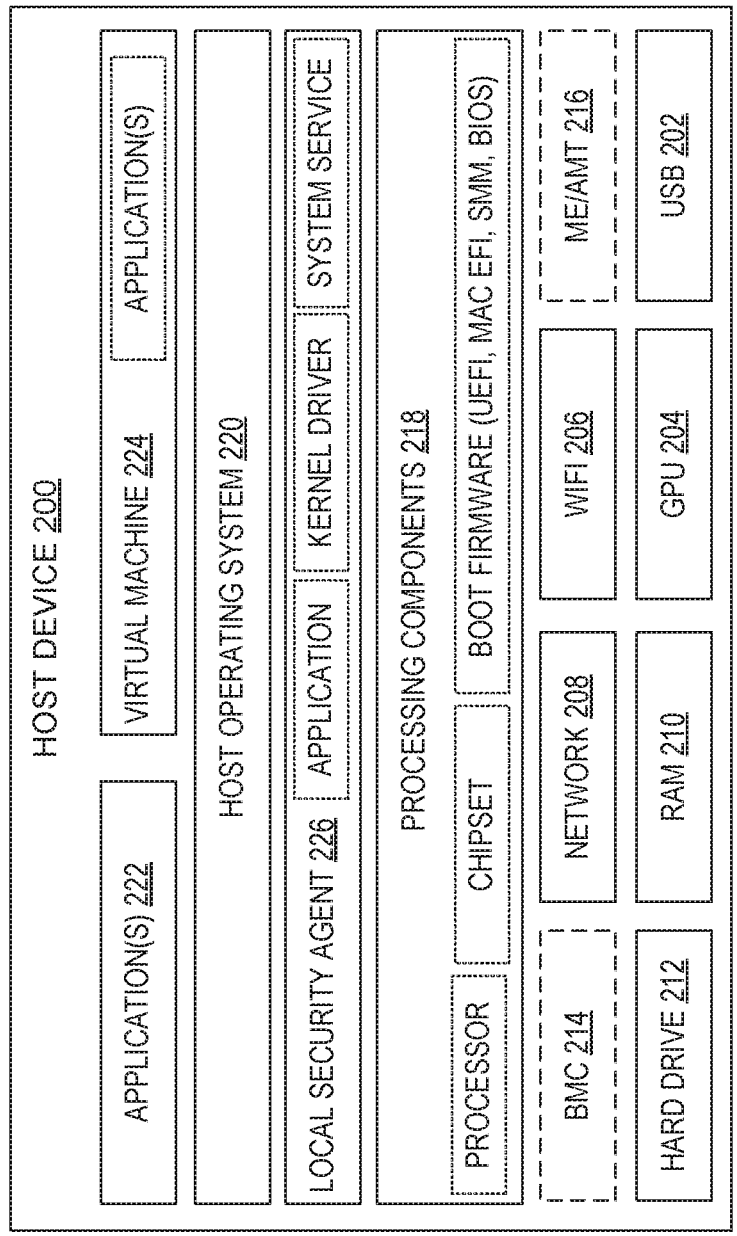
FIG. 2 shows an example block diagram of a host device in accordance with one or more embodiments of the present disclosure.

FIG. 2 is a block diagram of an example host device 200. The host device 200 may include a personal computing device, such as a laptop computer and/or a desktop computer, a server, and/or another computing device that is monitored for firmware/hardware security risks. At a hardware level, host device 200 includes a plurality of physical devices, such as Universal Serial Bus (USB) interface 202 (or other peripheral device interface), graphics processing unit (GPU) 204, WIFI interface 206, other networking interface 208, random access memory (RAM) 210, and hard drive 212.

The USB interface 202 (or other peripheral device interface) may include a physical interface and/or port for communicating with a peripheral device according to a USB (or other associated) protocol. The GPU 204 may include a physical card or chip including processing units, memory, and/or display interface components to control the display of images on the host device and/or on a display connected to the host device. The WIFI interface 206 and other networking interface 208 may include physical network interfacing elements (e.g., one or more antennas for wireless communication, a port for wired communication, etc.) and an interface controller for controlling communication between the host device and an external device. RAM 210 may include one or more physical memory chips configured to temporarily store data for use during execution of operations on the host device. Hard drive 212 may include one or more physical devices (e.g., a hard disk drive, a solid state drive, etc.) for storing data more permanently than RAM 210. Hard drive 212 may store data and instructions executable to perform operations on the host device.

The host device 200 may optionally include a baseboard management controller (BMC) 214, if the host device is a server, or a Management Engine (ME) or Active Management Technology (AMT) device 216, if the host device is a personal computer. As discussed above, the BMC, ME, and/or AMT devices may be physical devices configured to deliver dedicated management to the host device using hardware and interfaces that are independent of an operating system executed on the host device.

The physical level of the host device 200 may also include physical processing components 218. The processing components may include a processor, configured to execute instructions stored in memory, such as RAM 210 and/or hard drive 212, and a chipset configured to manage data flow between the processor, memory, and other physical devices of the host device. The processing components may operate according to boot firmware, defined according to specifications such as Unified Extensible Firmware Interface (UEFI), Mac Extensible Firmware Interface (Mac EFI), System Management Mode (SMM), and/or Basic Input/Output System (BIOS). The boot firmware may provide an interface between a host operating system of the host device and the hardware of the host device (e.g., during a booting operation of the host device).

The host operating system 220 may form the base of the software level of the host device, and may support the operation of other software elements, such as applications 222 and virtual machine 224 (which supports operation of one or more virtual applications). The host device 200 also includes a local security agent 226, configured to collect information from the host device for detecting hardware security risks. The local security agent 226 may also include a kernel driver configured to collect information about hardware and firmware on the host device. A software application and kernel driver are used to extract device configuration and integrity data from hardware and software interfaces of the host device 200. This configuration may allow for remote monitoring to analyze the integrity of the host device 200 and its components based upon remote access to available interfaces. Through such interfaces, firmware code and data (if available) of the host device may be extracted, along with configuration, timing, interrupts, execution counters, and related statistics of the host device. The interfaces that may be used to extract firmware include hardware interfaces such as Serial Peripheral Interface (SPI) or Memory Mapped Input Output (MMIO) interface. The SPI interface is available to software so provide read/write capability to the SPI chip, which is the storage device for system firmware. MMIO is a different method to get access to the same data over a mechanism of mapping SPI storage to memory. By using these multiple standard interfaces, reliability in the received data may be ensured. By analysis of change and correlation with data extracted from other devices across customer deployments and our own reputation database, anomalies may be indicated and thereby integrity issues may be identified. As part of this process components including firmware of similar devices (e.g., laptops of the same model) across the enterprise may be compared to continuously update the reputation.

For example, the kernel driver and/or a kernel extension may collect operating data and configuration information from processor and chipset hardware and system firmware (e.g., processing components 218), as well as the other physical components of the host device (e.g., USB interface 202, GPU 204, WIFI interface 206, networking interface 208, RAM 210, hard drive 212, BMC 214, and ME/AMT device 216). A system service may also be included in the local security agent 226, the system service being configured to manage and perform continuous monitoring of the host device. The local security agent 226 may include an application to communicate with an external administration and analysis service (e.g., an analysis service run on a server such as on-premises servers 106a/106b and/or cloud-hosted service 108 of FIG. 1). For example, the application of the local security agent may be executed to control the sending of collected data (e.g., collected via the kernel driver) to the external administration and analysis service over an encrypted and authenticated channel.

The local security agent 226 may be deployed on the host device in an ephemeral deployment mode or a persistent deployment mode. In the ephemeral deployment mode, the local security agent may not run (e.g., collect information from the host device) automatically, and instead the local security agent may only run responsive to user input from an administrator or responsive to a request from a third party tool to launch the local security agent. The ephemeral deployment mode may be used for one-time scans that establish a fingerprint of the state of firmware and hardware across a system, and may be useful when an administrator intends to manually control the scanning of host devices and/or intends to only scan host devices responsive to a maintenance event (e.g., when new systems are deployed in the organization, when firmware has been updated, when a host device in the organization has been outside of the secured network of the organization, etc.) and/or a security event (e.g., when a security risk is found in another host device in the organization, when digital forensics is being performed, when a security compromise has been identified as targeting the organization or has appeared in systems of other organizations, etc.).

In the persistent deployment mode, the local security agent may install a continuously-running service (e.g., the system service of local security agent 226) that collects data and scans firmware and hardware of the host device periodically based on a set configuration and every time the host device boots up (e.g., executes a boot sequence to load an operating system). In the persistent deployment mode, the local security agent may also continuously monitor the host device for specific behavior indicative of firmware and hardware security risks/implants. The configuration of the scanning by the local security agent may be modified by an administrator or other user (e.g., to change a frequency or timing of scans), and the administrator or other user may request an on-demand scan of the host device. The local security agents of a group of host devices in an organization may be controlled at the organization level by an administrator or other user (e.g., via the user interface). For example, an administrator may submit a request for an on-demand scan of a group of host devices through the user interface. In response to the request, each host device of the selected group of host devices may be scanned (e.g., simultaneously and/or within an interval of time). In order to reduce resource consumption arising from continuous communication between the local security agent and a centralized server hosting a analytics service, the local security agent may check for new requests (e.g., new scan requests) at selected intervals of time (e.g., once every 30 minutes). In such examples, a request for an on-demand scan may be serviced (e.g., the requested on-demand scan may be performed) once the associated local security agent receives the new request.

Figure 3:
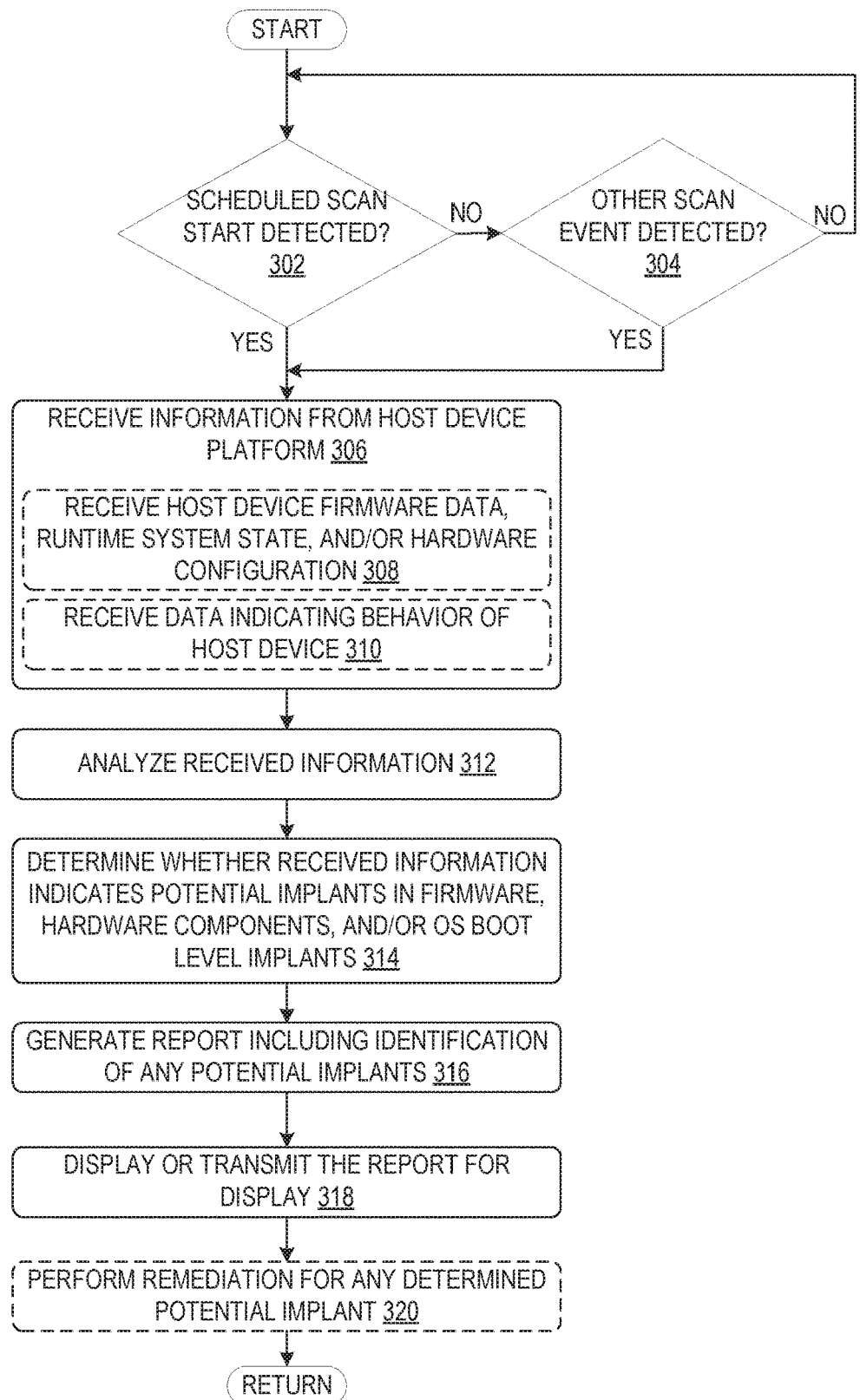
FIG. 3 shows a flow chart of an example method for monitoring security of a host device using an analytics service in accordance with one or more embodiments of the present disclosure.

FIG. 3 is a flow chart for an example method 300 of identifying security risks in a scanned system (e.g., a host device, such as host device 200 of FIG. 2). Method 300 may be performed using an analytics service running on a centralized server, such as on-premises servers 106a/106b and/or cloud-hosted service 108 of FIG. 1. At 302, the method includes determining if a scheduled scan start is detected. The scheduled scan start may be for one of a plurality of pre-scheduled scans in examples where a local security agent is installed on a host device to perform continuous/on-going monitoring of the host device (e.g., in a persistent deployment mode). In examples where a local security agent is installed on a host device to perform a single scan (or a number of manual scans, e.g., in an ephemeral deployment mode), the scheduled scan start may correspond to a user input request to begin a scan.

If a scheduled scan start is not detected (e.g., "NO" at 302), the method includes determining if another scan event is detected at 304. For example, scans may be started outside of a set schedule when events that affect the security of the host device are detected. As discussed above, such events may include a change in host device firmware and/or hardware, a detection of a security risk on other host devices, etc. If another scan event is not detected (e.g., "NO" at 304), the method returns to continue monitoring for scan initiation events. If either a scheduled scan start is detected (e.g., "YES" at 302) or another scan event is detected (e.g., "YES" at 304), the method includes receiving information from a host device platform at 306 (e.g., receiving information from a local security agent running on a host device). The information may be received over a secured (e.g., encrypted and authenticated) channel (e.g., over Hypertext Transfer Protocol Secure (HTTPS) using Transport Layer Security (TLS) 1.2).

As indicated at 308, receiving the information from the host device platform may include receiving host device firmware data, runtime system state information, and/or hardware configuration information. As indicated at 310, receiving the information from the host device platform may additionally or alternatively include receiving data indicating behavior of the host device. The amount of data sent to the backend (e.g., the amount of information received from the host device platform) may be minimized to conserve bandwidth. For example, the information may be compressed and/or selected to include truncated representations of the above-described information. In some examples, the amount of data received from the host device platform may be minimized by controlling the host device platform to only transmit data relevant to a particular scan or selected for the type of host device platform, and/or to only transmit data that relates to a change in monitored/transmitted information relative to one or more prior transmissions.

Accordingly, the local security agent may collect and send to the analytics service general information identifying the host device (e.g., Internet Protocol (IP) address, media access control (MAC) address, hostname, operating system version and vendor, etc.) and/or detailed information about the hardware and firmware (e.g., processor, chipset, devices, firmware vendor, release dates, system and device manufacturers and models, etc.). In some examples, the received data may be processed by the analytics service by applying extensible analytics including but not limited to whitelist, blacklist, dynamic whitelist, local and global reputation, non-compliance, behavioral telemetry, and anomaly detection, and by applying static analysis such as detection of embedded files, encryption/compression, UEFI GUIDs, third party modules, and binary similarity. The local security agent may additionally or alternatively collect certain hardware configuration (e.g., central processing unit (CPU), chipset and Input/Output (IO) registers, etc.) used to assess vulnerabilities and abnormalities which may indicate firmware or hardware implants. The local security agent may additionally or alternatively further collect information on firmware components (e.g., UEFI firmware, BIOS, ME/AMT firmware, BMC firmware, and/or other types of firmware) and/or information on the configuration and structures related to firmware components (e.g., Advanced Configuration and Power Interface (ACPI) tables, UEFI configuration and runtime tables, UEFI variables, etc.).

A redundant collection of data using separate components, execution environments, or interfaces may be used in order to increase the difficulty of spoofing/evading detection, at least in some examples. To ensure the reliability of the data against evasion techniques, multiple hardware interfaces may be used such as SPI and MMIO to extract firmware across UEFI BIOS, ensuring that the same results are observed. In the case of Baseboard Management Controllers (BMC), LPC and PCI interfaces may be used to read the content of the SPI chip.

Behavioral analysis involves monitoring and mapping specific heuristics associated with the runtime execution of firmware that is specific to a hardware component. In this case the heuristics may be applied to the monitoring hardware runtime configurations looking for specific behaviors that may represent suspicious or malicious activity. These can include statistics on configuration of hardware settings, execution of system management interrupts (SMIs), component access (e.g., network access) or timing. These statistics are used to establish a baseline hardware profile for the device which can then be used to determine suspicious activity. After establishing a baseline hardware profile, continuous scanning may be performed and changes to specific hardware components may be monitored to ensure that any deviation from baseline is detected in order to detect possible compromise. In this way, device data is extracted and compared against previous results, providing indications of change. Changes to deviation from the profile may be related to firmware version and hash changes, new vulnerabilities detected, compromise or threat detected, integrity failure (unknown hash compared to vendor white list), or new PCI device attached. The level of deviation that is tolerable may be determined on a case by case basis where even a bit setting change such as secure boot disabled may be a concern.

Static analysis is the ability to apply various heuristics to firmware binaries and/or embedded files to identify specific attributes that are associated with malware. The process involves developing a static analysis that maps heuristics and indicators of compromise (IOC) data to firmware binaries that indicates vulnerabilities or potential threats. These heuristics apply to specific elements of the code within a firmware binary that indicate attempts to bypass hardware protections or exploit vulnerabilities to gain privilege. Examples of heuristics include identifying entropy or encoding suggestive of malware payload, a file system which also indicates compromise, or a network stack which would indicate attempt to communicate to a command and control server. Thus, IOC data and heuristics may be utilized, such as looking for a signature within an image (e.g., which indicates a malware payload), network access, and/or firmware malicious components. For behavioral indicators, timing changes or interrupts that should not occur may be detected to identify that a threat has occurred. The heuristic model may include monitoring for specific events or interrupts like an SMI or security sensitive register configurations like BIOS_WP being disabled.

The heuristics and whitelisting mentioned above may additionally or alternatively be applied to a hardware profile. By collecting a history of device data (including firmware measurements, configuration, timing, interrupts, execution counters, and related statistics), a hardware profile may be established that indicates the expected attributes of a given host device. This profile, in addition to its utility for integrity measurement as discussed previously, enables queries for affected devices when vulnerabilities or other issues are discovered. Similarly, the profile may be used in identifying non-compliance with the expected baseline as part of a configuration management solution that covers firmware and hardware components.

At 312, the method includes analyzing the received information (e.g., the information received at 306). A more detailed description of analysis that may be performed is described below with respect to FIG. 4. As indicated at 314, the method includes determining whether the received information indicates potential implants in firmware, hardware components, and/or operating system boot level implants. At 316, the method includes generating a report including an identification of any potential implants. For example, the report may include an identification of a risk factor (e.g., an indicator of a potential security risk), an identification of a component/device at-risk, a confidence score (e.g., how likely an implant or other security issue is present in the affected components based on the detected signs of compromise), and/or any other information identifying a potential security risk detected during analysis. As used herein, a "scan" may refer to an execution of one or more of the actions of method 300, such as collecting data from a selected system and analyzing the data to identify potential security risks in the selected system. Accordingly, a generated report may output the findings of a given scan.

At 318, the method includes displaying or transmitting the report for display. For example, the report may be provided to a user interface (e.g., user interface 110 of FIG. 1) to allow an administrator or other user to view the results of the analysis. The user interface may compile results of multiple analyses performed for multiple devices of an organization in order to provide immediate and summarized risk information of an overall security state of monitored systems, including any detected risks, systems with outdated firmware, systems that have had recent firmware changes, newly registered systems, systems that have been offline for a threshold amount of time, and systems that fail integrity checks. Hosts within an organization may be grouped by selected criteria, and group-level policies may be managed via the user interface. The user interface may also include a deeper analysis that provides flexible filters to allow users to select systems based on one or more hardware and/or software characteristics, and result trends (e.g., outcomes of various scans of the systems) over time may be shown to a user via visualizations and/or textual output. Information for individual systems (e.g., individual host devices) may include firmware and hardware inventory of the host, including known release dates/component age for components of the host, results of firmware scans including integrity verification of firmware components, whitelisting checks, scans for known confirmed threats, etc. The information for individual systems may further include results of runtime heuristics, results of vulnerability scans for the host, and binary blobs of extracted firmware components. The above features of a scan are discussed in more detail below with respect to FIG. 4. The user interface may also provide a selectable option for a user to request a re-run of one or more scans and/or analyses, and/or a selectable option for a user to request to remove or un-enroll a respective host device from the security monitoring system (e.g., to stop further scanning of the host device).

The user interface may also allow an administrator or other selected user to adjust configuration settings relating to the operation of local security agents and the analysis service. The settings may include the configuration of scheduled scanning tasks, firmware integrity and whitelist scanning, detection of known firmware threats, runtime heuristics, detection of firmware and hardware vulnerabilities, and deployment of the local security agents.

An administration page of the user interface may enable the administrator to manage access methods to the user interface, including creating and managing accounts (e.g., accounts that are authorized to use the user interface in some manner) and associated access level (e.g., role delegation, which may define the information that is viewable by a user associated with a respective account and a control that the user associated with the respective account may provide via the user interface). The administration page may also enable an administrator to create and manage consumers of the analysis service.

Returning to FIG. 3, the method may optionally include performing remediation for any determined potential implant, as indicated at 320. For example, any affected systems may be isolated via hardware-based mechanisms to avoid contaminating other devices in an organization. In some examples, the bus may notify other devices on the bus if a blacklisted USB device is plugged into the computer.

Figure 4:
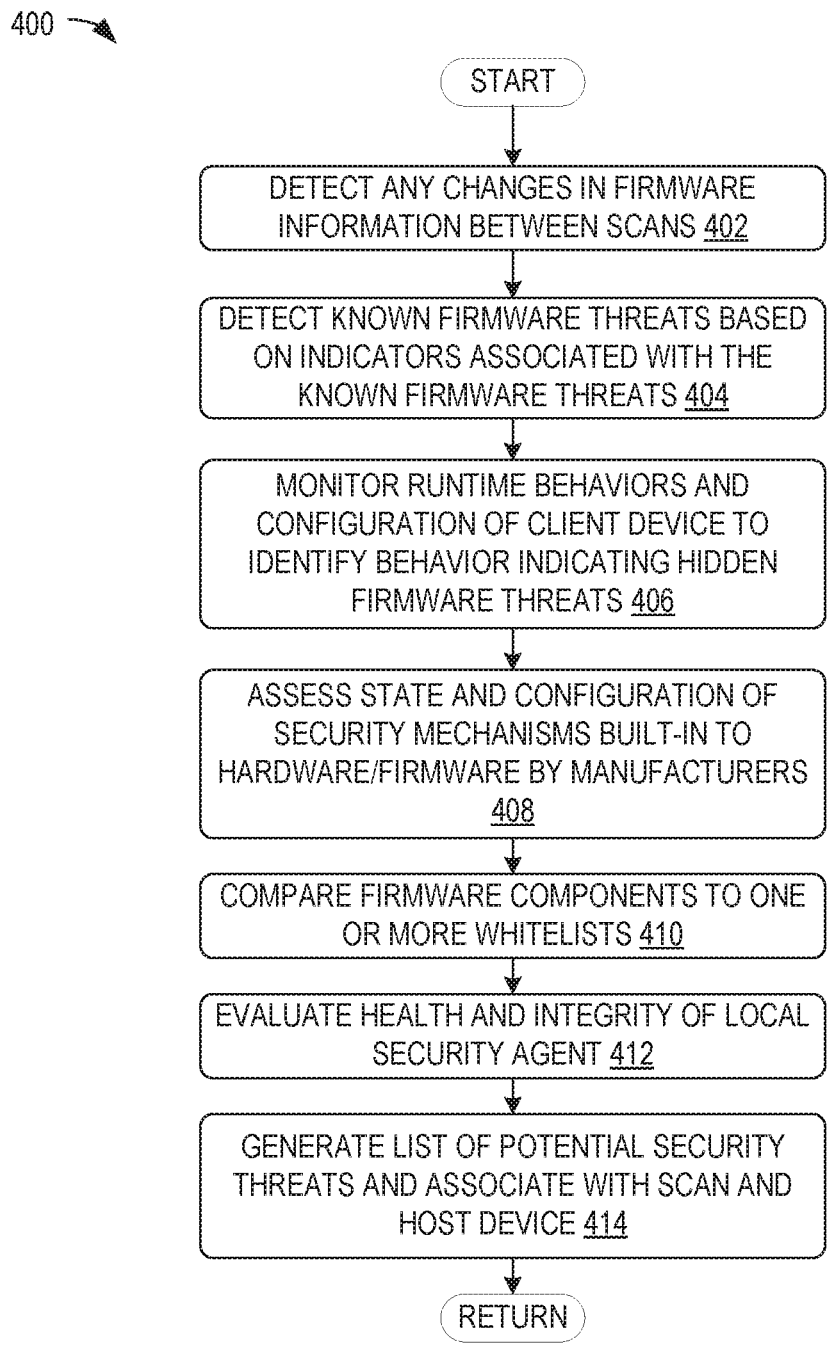
FIG. 4 shows a flow chart of an example method for analyzing data received from a host device to detect potential hardware and/or firmware threats in accordance with one or more embodiments of the present disclosure.

FIG. 4 shows an example method 400 for analyzing data received from a host device to detect potential hardware and/or firmware threats. Method 400 may be performed using an analytics service running on a centralized server, such as on-premises servers 106a/106b and/or cloud-hosted service 108 of FIG. 1. For example, method 400 may be performed to provide the analysis, determination, and report generation described above at 312-316 of FIG. 3. The analysis performed in method 400 for a given host device may use data captured from a current scan of the host device (e.g., received at 306 of FIG. 3), data captured from previous scans of the host device, data captured from scans of other host devices, and/or other related information. For example, a cross-correlation and discrepancy detection of firmware data collected via independent methods on a single system and across multiple systems may be performed in order to provide additional security monitoring of a host device.

At 402, the method includes detecting any changes in firmware information between scans. As an example, firmware may be tampered with when a device is carried outside of a secured area (e.g., when a user travels with a device). As another example, a UEFI implant may install new malicious UEFI executables or create new UEFI variables. Changes in firmware information may indicate potential security risks, such as those described above, enabling a system administrator to recognize the security risk before other symptoms of the security risk (e.g., firmware/hardware implant) are detected.

At 404, the method includes detecting known firmware threats based on indicators associated with the known firmware threats. For example, the analytics service may maintain a continuously-updated database of discovered hardware-level security threats (including those found in a current system/locally as well as those found in other systems/globally). Detecting known firmware threats may include performing evaluations such as reviewing firmware binary images and configuration for known firmware implants based on known indicators of compromise or infection markers. As discussed in an example above, a UEFI implant may install new known malicious UEFI executables or create new UEFI variables, and identifying features of these executables/variables may be stored for comparison to a scanned host device. Presence of the known executables/variables may indicate the presence of the UEFI implant.

At 406, the method includes monitoring runtime behaviors and configuration of the client device (e.g., the host device from which the data was scanned) to identify behavior indicating hidden firmware threats. The monitoring at 406 may include creating a heuristic model and analysis of system behavioral data, with alerting of behavior anomalies. For example, a firmware implant may utilize hardware mechanisms to avoid detection, however, the altered behavior of the system due to the implant and/or the use of the hardware mechanisms may be detected by the analytics service and logged as an indicator of a potential implant. The heuristic model may be continuously and dynamically updated (e.g., using machine-learning algorithms) as additional behaviors (both expected/normal operating behaviors and anomalous behaviors indicating a firmware threat) are detected.

At 408, the method includes accessing a state and configuration of security mechanisms built-in to hardware and/or firmware by manufacturers of the hardware/firmware. For example, the analytics service may detect versions of particular firmware on the host devices of an organization, discover latest firmware updates from associated hardware vendors, and selectively distribute/coordinate updates of the firmware on the host devices with out-of-date firmware (e.g., firmware with different versions than a latest or latest stable update).

At 410, the method includes comparing firmware components to one or more whitelists. For example, the analytics service may maintain and/or consult a list of trusted (e.g., known good) firmware components and compare the firmware components of a host device to the whitelist to verify that the firmware components of the host device are trusted. As a more detailed example, the analytics service may confirm firmware binary images against known good binary image databases, where the databases may include a dynamically created and managed database that is organization-specific. The database(s) may include independently collected measurements of firmware from a plurality of host devices that is integrated into the system backend along with information about the measurement source (e.g., the host device) for each firmware measurement, enabling integrity checks of operational systems against the previously known measurements. In some examples, adaptive whitelisting may be performed, which automatically incorporates measurements that meet a set of criteria into the expected values for a host device. For example, if a host device includes customized firmware that has not been seen before, its measurements may be automatically added to the whitelist after a certain threshold of observations have been made. Through the analytics service, a large database (as mentioned above) of firmware images/hashes are assembled which is regularly analyzed to build a reputation (integrity, risk, confirmed threat, change). This repository of updated firmware hashes and their reputation may be continuously curated based on sourcing telemetry from the plurality of host devices (which may include devices belonging to IOCs, vendors, and customers) while applying firmware heuristics for static and behavioral analysis. In doing so, firmware reputation changes across hardware components may be continuously monitored. The reputation of device(s) may be updated based on any deviations from the existing profile which focuses on integrity, risk, threat, and firmware change. As an example, an enterprise may have 1000 laptops of certain model where 510 hashes across all components match for 999 devices except one device. In this case the mismatch in hashes for this device is an indication of a reputation change.

At 412, the method includes evaluating health and integrity of a local security agent. For example, if a local security agent is compromised, the local security agent may no longer send accurate data back to the analytics service and/or may provide a gateway to modify other components of the host device on which the local security agent is installed. Accordingly, a security risk may be identified if the health and/or integrity of the local security agent is lower than a threshold. In some examples, monitoring the health and integrity of the local security agent may be include similar mechanisms to evaluating the firmware (e.g., look for unusual behavior, examine code for unexpected additions, etc.).

At 414, the method includes generating a list of potential security threats and associating the threats with the scan (e.g., using a date, time, and/or scan identifier) and host device on which the threats were discovered. As discussed above, this list may be used to update a user interface that provides information on the overall state of a selected host device. Although the list is shown being generated after performing the other analyses at 402-412, it is to be understood that alerts may be issued dynamically at the discovery of any security threat (e.g., depending on an urgency and/or probability associated with the threat).

It is often the case that firmware updates from hardware vendors associated with a vulnerability have long lead times and/or enterprise companies may not be able to update due to maintenance windows. When weaknesses, vulnerabilities, or misconfigurations in a system are identified as described above, a virtual patching capability may be deployed as an emergency stop gap to the risk until a more permanent fix is available from manufacturers of the system. The virtual patch concept involves both identifying the vulnerability or misconfiguration and making specific modifications to the firmware or hardware settings such that the risk of an attack is removed. The technology can temporarily enforce missing hardware protections, detecting and blocking exploitation attempts. This provides protection against exploits that leverage such vulnerabilities in the affected system. This can be an important interim layer of protection in times of crisis, as firmware updates and patches can be infrequent, leading to potentially long periods of exposure. Some examples of this capability could involve loading a micro-code patch for a specific CPU vulnerability or enabling a BIOS write protect bit which when not enabled exposes a firmware storage control vulnerability.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the servers 106, 106b, and/or service 108 of FIG. 1 and/or the local security agent 226 of FIG. 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A client system comprising:
   a data interface including a secured channel between the client system and a remote cloud-hosted service;
   a processor; and
   a storage device storing instructions executable by the processor to:
      perform a scan of the client system by a local security agent to collect configuration information relating to specific firmware and/or hardware components on the client system;
      transmit, via the data interface, data associated with the configuration information from the scan to the remote cloud-hosted service;
      perform real-time analysis of running system configuration and operation of the client system to determine suspicious behavior indicative of implants in the client system by assessing a state and configuration of security mechanisms built-in to the specific firmware and/or hardware components by manufacturers of the specific firmware and/or hardware components; and
      perform remediation for the implants in the specific firmware and/or hardware components on the client system.

2. The client system of claim 1, wherein the specific firmware and/or hardware components include the processor and/or a chipset hardware of the client system, system firmware, management controllers, the storage device, a network card, a graphics card, and/or an internal or add-on device.

3. The client system of claim 1, wherein the secured channel is an encrypted and authenticated channel to the remote device.

4. The client system of claim 1, wherein the instructions are further executable to review firmware binary images for predefined firmware implants based on indicators and/or markers of the predefined firmware implants, the indicators and/or markers of the predefined firmware implants including network access and/or firmware malicious components.

5. The client system of claim 1, wherein the instructions are further executable to analyze behavioral data relating to the client system using a heuristic model and to generate an alert responsive to detecting a behavior anomaly, the behavioral data including unexpected timing changes or interrupts.

6. The client system of claim 1, wherein the instructions are further executable to compare firmware binary images with predefined binary images stored in a database.

7. The client system of claim 1, wherein the instructions are further executable to update a web-based interface to indicate a detected threat to security of the client system.

8. A server system comprising:
   a data interface including a secured channel between the server system and a client system;
   a processor; and
   a storage device storing instructions executable by the processor to:
      receive, via the data interface, data associated with boot firmware and/or hardware information of specific components on the client system from a local scan of the client system, wherein the boot firmware is defined according to a Unified Extensible Firmware Interface (UEFI);
      analyze the received data to detect suspicious behavior indicative of implants in the specific components on the client system based on an assessment of a state and configuration of security mechanisms built-in to the specific components by manufacturers of the specific components; and
      perform remediation for the implants in the specific components on the client system.

9. The server system of claim 8, wherein the instructions are further executable to generate an alert responsive to detecting a security threat to the client system, and wherein the specific components include the processor and/or a chipset hardware of the client system, system firmware, management controllers, the storage device, a network card, a graphics card, and/or an internal or add-on device.

10. The server system of claim 8, wherein the secured channel is an encrypted and authenticated channel from the client system.

11. The server system of claim 8, wherein the instructions are further executable to review firmware binary images for predefined firmware implants based on indicators and/or markers of the predefined firmware implants.

12. The server system of claim 8, wherein the instructions are further executable to analyze behavioral data relating to the client system using a heuristic model and to generate an alert responsive to detecting a behavior anomaly.

13. The server system of claim 8, wherein the instructions are further executable to compare firmware binary images with predefined binary images stored in a database, and wherein the instructions are further executable to update a web-based interface to indicate a detected threat to security of the client system.

14. A method for detecting vulnerabilities in a client system, the method comprising:
   collecting boot firmware and/or hardware information relating to specific components on the client system from a local scan;
   transmitting data associated with the firmware and/or hardware information to a remote cloud-hosted service over a secured channel;
   analyzing the data associated with the firmware and/or hardware information to detect suspicious behavior indicative of implants in the specific components on the client system based on an assessment of a state and configuration of security mechanisms built-in to the specific components by manufacturers of the specific components, wherein the boot firmware is defined according to a Unified Extensible Firmware Interface (UEFI); and
   performing remediation for the implants in the specific components on the client system.

15. The method of claim 14, wherein the specific components include the processor and/or a chipset hardware of the client system, system firmware, management controllers, the storage device, a network card, a graphics card, and/or an internal or add-on device.

16. The method of claim 14, further comprising reviewing firmware binary images for predefined firmware implants based on indicators and/or markers of the predefined firmware implants.

17. The method of claim 14, further comprising analyzing behavioral data relating to the client system using a heuristic model and generating an alert responsive to detecting a behavior anomaly.

18. The method of claim 14, further comprising comparing firmware binary images with predefined binary images stored in a database.

\* \* \* \* \*